US011859646B2

(12) United States Patent
Fujii et al.

(10) Patent No.: US 11,859,646 B2
(45) Date of Patent: Jan. 2, 2024

(54) VORTEX RING GENERATION DEVICE

(71) Applicant: DAIKIN INDUSTRIES, LTD., Osaka (JP)

(72) Inventors: Chiho Fujii, Osaka (JP); Chie Emura, Osaka (JP); Yousuke Imai, Osaka (JP); Masafumi Uda, Osaka (JP); Mizuho Ueno, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 488 days.

(21) Appl. No.: 17/212,513

(22) Filed: Mar. 25, 2021

(65) Prior Publication Data

US 2021/0207628 A1 Jul. 8, 2021

Related U.S. Application Data

(63) Continuation of application No. PCT/JP2019/037658, filed on Sep. 25, 2019.

(30) Foreign Application Priority Data

Sep. 28, 2018 (JP) ................................ 2018-184721

(51) Int. Cl.
*F15D 1/00* (2006.01)
*F15C 1/16* (2006.01)
(Continued)

(52) U.S. Cl.
CPC .............. *F15D 1/009* (2013.01); *B05B 17/06* (2013.01); *F15C 1/14* (2013.01); *F15C 1/16* (2013.01);
(Continued)

(58) Field of Classification Search
CPC .... F15D 1/009; F15C 1/16; F15C 1/14; F24F 8/80; F24F 7/003; F24F 2221/46; B05B 17/06
(Continued)

(56) References Cited

U.S. PATENT DOCUMENTS 2,855,714 A * 10/1958 Thomas ................ A63H 33/28 124/55
3,940,060 A * 2/1976 Viets ...................... A01G 15/00 239/14.1
(Continued)

FOREIGN PATENT DOCUMENTS

JP 2008-18394 A 1/2008
JP 2017-53592 A 3/2017

OTHER PUBLICATIONS

European Search Report of corresponding EP Application No. 19 86 7031.7 dated Mar. 22, 2022.
(Continued)

*Primary Examiner* — Minh Q Le
(74) *Attorney, Agent, or Firm* — Global IP Counselors, LLP

(57) ABSTRACT

A vortex ring generation device includes a casing having a gas passage and a discharge port, and an extrusion mechanism that extrudes a gas in the gas passage such that the gas in a vortex ring shape is discharged from the discharge port. V ($m^3$) represents an extrusion volume, D (m) represents a diameter of the discharge port, L (m) represents a length of a cylinder having the diameter D and the volume V, and Re represents a Reynolds number of the discharged gas. $500 \leq Re \leq 3000$ and $0.5 \leq L/D \leq 2.0$.

6 Claims, 3 Drawing Sheets

(51) Int. Cl.
*F15C 1/14* (2006.01)
*F24F 7/003* (2021.01)
*F24F 8/80* (2021.01)
*B05B 17/06* (2006.01)

(52) U.S. Cl.
CPC ................. *F24F 7/003* (2021.01); *F24F 8/80* (2021.01); *F24F 2221/46* (2013.01)

(58) Field of Classification Search
USPC .......... 138/39; 137/808, 809, 810, 811, 812, 137/813; 239/3, 699
See application file for complete search history.

(56) References Cited

U.S. PATENT DOCUMENTS 4,534,914 A * 8/1985 Takahashi ............. B01F 33/403 239/533.13
5,052,813 A * 10/1991 Latto ..................... B01F 31/651 366/267
5,181,475 A * 1/1993 Breen ..................... F23C 6/047 110/212
5,483,953 A * 1/1996 Cooper ..................... F15D 1/00 128/203.29
5,823,434 A * 10/1998 Cooper ................. B05B 7/0012 239/398
7,673,834 B2 * 3/2010 Harman .................. F42B 10/24 244/199.1
8,607,774 B2 * 12/2013 Davis .................... F41B 11/643 124/55
9,092,953 B1 * 7/2015 Mortimer ................ G06F 3/016
9,339,772 B1 * 5/2016 Brav ................... B01F 23/2132
2003/0177899 A1 9/2003 Monson et al.
2004/0051187 A1 * 3/2004 Thomas ............... A01K 63/042 261/121.1
2006/0145366 A1 * 7/2006 Thomas ................ B01F 33/403 261/123
2007/0261438 A1 * 11/2007 Ezaka .................. B60H 3/0028 62/643
2008/0264505 A1 * 10/2008 Matsuo .................... B60H 1/34 137/808
2010/0303671 A1 * 12/2010 Bertrand ............... B05B 12/122 422/119
2013/0214054 A1 * 8/2013 Faulkner ................... B05B 5/03 239/3
2014/0147308 A1 * 5/2014 Fujiwara ............... F04B 17/042 417/413.1
2015/0300385 A1 * 10/2015 Akagi ..................... F24F 13/06 137/808
2015/0328960 A1 * 11/2015 Castillo .............. B60H 1/00457 454/155
2016/0045696 A1 * 2/2016 Siriwardena ......... A61B 5/0205 128/204.23
2017/0057772 A1 * 3/2017 Prinsen ................ B65H 15/004
2021/0207629 A1 * 7/2021 Imai ........................ F15D 1/009
2021/0220844 A1 * 7/2021 Fujii ..................... F24F 13/068
2023/0103431 A1 * 4/2023 Emura .................... B05B 15/60 138/39

OTHER PUBLICATIONS

International Search Report of corresponding PCT Application No. PCT/JP2019/037658 dated Nov. 5, 2019.
International Preliminary Report of corresponding PCT Application No. PCT/JP2019/037658 dated Apr. 8, 2021.

* cited by examiner

VORTEX RING GENERATION DEVICE

CROSS-REFERENCE TO RELATED APPLICATIONS

This is a continuation of International Application No. PCT/JP2019/037658 filed on Sep. 25, 2019, which claims priority to Japanese Patent Application No. 2018-184721, filed on Sep. 28, 2018. The entire disclosures of these applications are incorporated by reference herein.

BACKGROUND

Field of Invention

The present disclosure relates to a vortex ring generation device.

Background Information

Japanese Unexamined Patent Publication No. 2008-018394 discloses a device that generates a vortex ring and supplies the vortex ring containing, for example, a scent component to a predetermined region.

In the device of Japanese Unexamined Patent Publication No. 2008-018394 the vortex ring and a straight flow passing through the inside of the vortex ring are generated by limiting a UT/R (a ratio of an extrusion volume to the radius of an outlet) range and a Reynolds number range of air, where U represents the velocity of the extrusion air, T represents the discharge time, and R represents the radius of an opening of a discharge port.

SUMMARY

A first aspect of the present disclosure is directed to a vortex ring generation device including: a casing having a gas passage and a discharge port; and an extrusion mechanism configured to extrude a gas in the gas passage such that the gas in a vortex ring shape is discharged from the discharge port. When V ($m^3$) represents an extrusion volume, D (m) represents a diameter of the discharge port, L (m) represents a length of a cylinder (an equivalent length of a cylinder) having the diameter D and the volume V, and Re represents a Reynolds number of the discharged gas, $500 \leq Re \leq 3000$ and $0.5 \leq L/D \leq 2.0$.

DETAILED DESCRIPTION OF EMBODIMENT(S)

Hereinafter, embodiments will be described with reference to the drawings. The embodiments below are merely exemplary ones in nature, and are not intended to limit the scope, applications, or use of the present invention.

A vortex ring generation device (10) according to an embodiment discharges vortex ring-shaped air (a vortex ring (R)). The vortex ring generation device (10) causes a predetermined discharge component to be contained in the vortex ring (R), and then supplies the vortex ring (R) containing the discharge component to, for example, a subject. The discharge component contains substances such as a scent component, water vapor, and a substance having predetermined efficacy. The discharge component is preferably a gas, but may be a liquid. In the case of liquid, the discharge component is preferably a particulate liquid.

Figure 1:
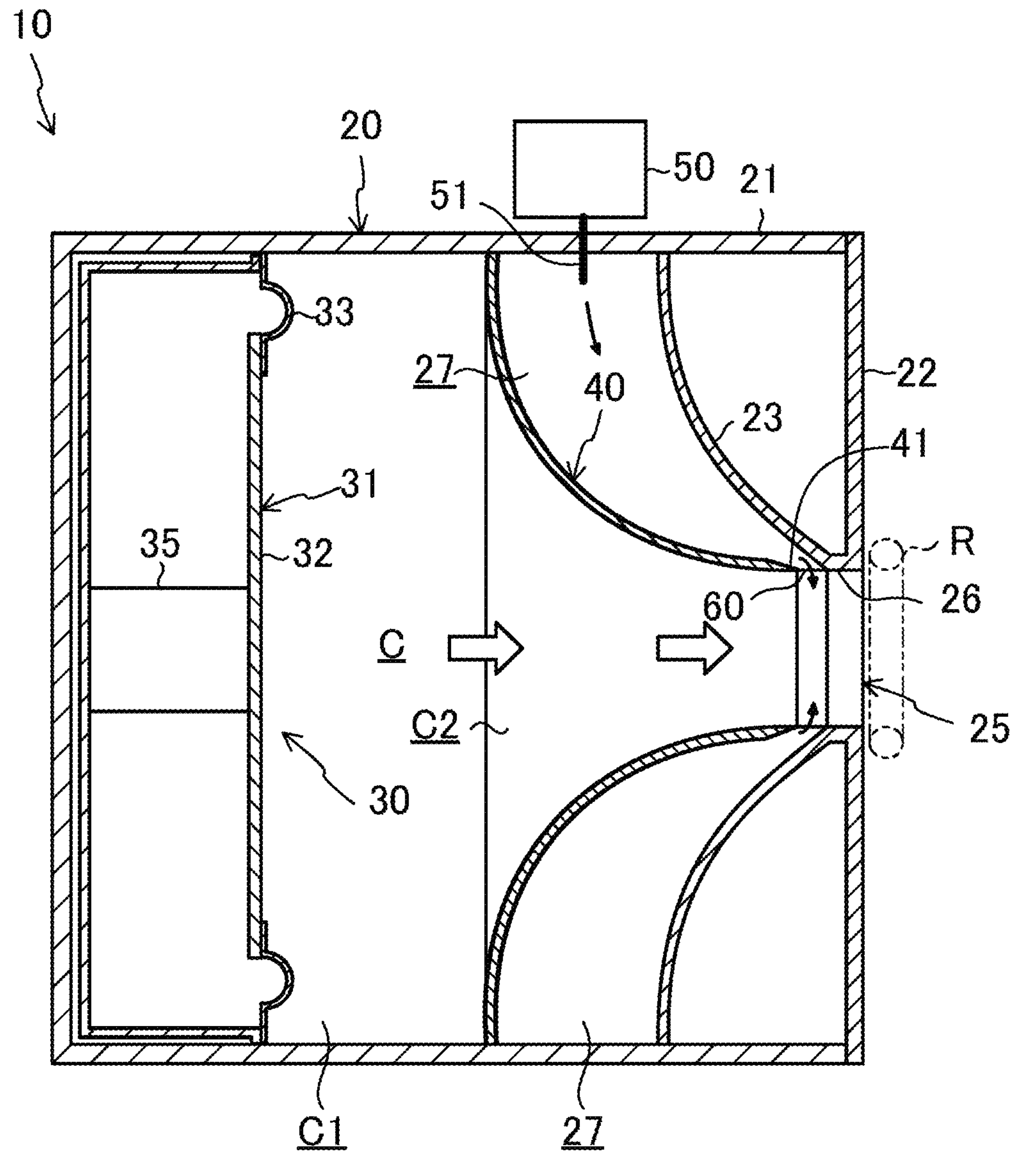
FIG. 1 is a schematic cross-sectional view of an internal structure of a vortex ring generation device according to an embodiment.

As illustrated in FIG. 1, the vortex ring generation device (10) includes: a casing (20) having a discharge port (25); an extrusion mechanism (30); a passage forming member (40); and a component supply device (50). An air passage (gas passage) (C) through which air flows is formed inside the casing (20). In the vortex ring generation device (10), the air in the air passage (C) is extruded by the extrusion mechanism (30), formed into the vortex ring (R), and discharged from the discharge port (25). The vortex ring (R) discharged from the discharge port (25) contains the discharge component supplied from the component supply device (50).

Casing

The casing (20) includes a casing body (21) having a front side open, and a substantially plate-like front panel (22) blocking the open face on the front side of the casing body (21). The casing (20) has a hollow cuboid shape. A middle portion of the front panel (22) has the discharge port (25) in the circular shape passing therethrough in a front-rear direction. A peripheral wall (23) in a substantially cylindrical shape continues on a rear surface of the front panel (22). The peripheral wall (23) extends rearward from an inner peripheral edge (26) of the discharge port (25). The peripheral wall (23) has a tapered shape whose diameter becomes smaller frontward. An outer peripheral end of the peripheral wall (23) is fixed to an inner wall of the casing body (21). A front leading end portion of the peripheral wall (23) is continuous with the inner peripheral edge (26) of the discharge port (25). An center axis of the peripheral wall (23) substantially coincides with that of the discharge port (25).

Passage Forming Member

The passage forming member (40) is disposed rearward of the peripheral wall (23). The passage forming member (40) is formed in a substantially cylindrical shape along an inner peripheral surface of the peripheral wall (23). The passage forming member (40) has a tapered shape whose diameter becomes smaller frontward (i.e., downstream of the air passage (C)). A center axis of the passage forming member (40) substantially coincides with that of the discharge port (25). The center axis of the passage forming member (40) substantially coincides with that of the peripheral wall (23).

A component chamber (27) in which the discharge component is temporarily stored is defined in space surrounded by the inner wall of the casing body (21), the peripheral wall (23), and the passage forming member (40). The component chamber (27) is a substantially cylindrical space formed around the passage forming member (40).

Extrusion Mechanism

The extrusion mechanism (30) is disposed in the rearward inside the casing (20).

The extrusion mechanism (30) has a vibration plate (31) that is a movable member, and a linear actuator (35) that displaces the vibration plate (31) back and forth. The vibration plate (31) includes a vibration plate body (32) and a frame-shaped elastic support (33) disposed at an outer peripheral edge of the vibration plate body (32). The vibration plate (31) is fixed to an inner wall of the casing (20) via the elastic support (33). The linear actuator (35) constitutes a drive unit that vibrates the vibration plate (31) back and forth. A base end (rear end) of the linear actuator (35) is supported by a rear wall of the casing body (21). A leading end (front end) of the linear actuator (35) is coupled with a center portion of the vibration plate (31).

The linear actuator (35) vibrates the vibration plate (31) between a reference position and an extrusion position. Thus, the air (indicated by an open arrow in FIG. 1) in the air passage (C) is extruded forward.

Air Passage

The air passage (C) extends from the vibration plate (31) to the discharge port (25) in the casing (20). The air passage (C) includes a first passage (C1) and a second passage (C2) continuous with a downstream end of the first passage (C1). The first passage (C1) is surrounded by the inner wall of the casing body (21). A passage area of the first passage (C1) is constant. The second passage (C2) is formed inside the passage forming member (40). Specifically, the second passage (C2) is surrounded by the peripheral wall (23). The second passage (C2) constitutes a throttle passage whose passage area becomes smaller toward its downstream. Thus, in the second passage (C2), the flow rate of air gradually increases toward its downstream.

Component Supply Device

The component supply device (50) supplies, into the casing (20), the discharge component to be applied to the vortex ring (R). Specifically, the component supply device (50) supplies, via a supply passage (51), the predetermined discharge component to the component chamber (27) defined inside the casing (20). The component supply device (50) includes a component generation unit (not shown) that generates the discharge component and a conveyance unit (not shown) that conveys the discharge component generated in the generation unit. The component generation unit is, for example, of a vaporizing type that vaporizes the discharge component from a component raw material. The conveyance unit is, for example, an air pump. The component supply device (50) appropriately supplies, to the component chamber (27), the discharge component whose concentration has been adjusted to a predetermined concentration.

Component Supply Port

The vortex ring generation device (10) has a component supply port (60) for supplying the discharge component to the air passage (C). In the present embodiment, the casing (20) has one component supply port (60). The component supply port (60) is located adjacent to the discharge port (25).

More specifically, the component supply port (60) is disposed between a downstream end (41) of the passage forming member (40) in a cylinder axial direction and the inner peripheral edge (26) of the discharge port (25). Thus, one annular (strictly speaking, toric) component supply port (60) is formed around the downstream end of the air passage (C). Specifically, one annular component supply port (60) is formed near the discharge port (25) in the air passage (C).

Operation

The basic operation of the vortex ring generation device (10) will be described with reference to FIG. 1.

When the vortex ring generation device (10) is in operation, the linear actuator (35) vibrates the vibration plate (31). When the vibration plate (31) deforms forward, the volume of the air passage (C) decreases. As a result, the air in the air passage (C) flows toward the discharge port (25).

The air in the first passage (C1) flows into the second passage (C2). In the second passage (C2), the passage area gradually decreases, so that the flow rate of air increases. When the flow rate of the air increases, the pressure of the air decreases. In particular, an outlet end of the second passage (C2) has the smallest passage area. Therefore, the flow rate of the air at the outlet end of the second passage (C2) is substantially the highest in the air passage (C). Consequently, the pressure of the air at the outlet end of the second passage (C2) is substantially the lowest.

The component supply port (60) is located at the outlet end of the second passage (C2). Therefore, when the air at low pressure passes through the component supply port (60), the discharge component in the component chamber (27) is sucked into the air passage (C) due to the difference between the pressure of the air and the pressure in the component chamber (27). When the discharge component in the component chamber (27) is sucked into the air passage (C), the discharge component is dispersed in the air passing through the component supply port (60).

The constant flow rate of the air passing through the component supply port (60) allows a constant amount of the discharge component to be sucked from the component supply port (60). This allows the concentrations of the discharge component in the air and the vortex ring (R) to be controlled to be constant.

Since the component supply port (60) has an annular shape surrounding the air passage (C), the discharge component in the component chamber (27) is dispersed over the entire circumference of the air passage (C). Further, the discharge component is easily applied to the air flowing through the air passage (C), in particular, to the air near the outer periphery. This allows, in the air passage (C), the discharge component to be uniformly applied to the air near the outer periphery.

In this way, the air containing the discharge component reaches the discharge port (25) immediately. The air passing through the discharge port (25) has a relatively high flow rate, whereas the air around the discharge port (25) is still. For this reason, a shearing force acts on the air at discontinuous planes of both air flows, and a vortex flow is generated adjacent to an outer peripheral edge of the discharge port (25). The vortex flow forms a vortex ring-shaped air (vortex ring (R) schematically shown in FIG. 1) moving forward from the discharge port (25). The vortex ring (R) containing the discharge component is supplied to the subject.

As described above, the discharge component is supplied over the entire circumference of the air flow from the component supply port (60). Therefore, the discharge component is also dispersed in the vortex ring (R) circumferentially. This allows reduction in uneven distribution of the discharge component in the vortex ring (R). The discharge component is supplied from the component supply port (60), in particular, to the air at an outer peripheral side. This allows most of the discharge component in the component chamber (27) to be contained in the vortex ring (R).

The component supply port (60) is located adjacent to the discharge port (25). If the component supply port (60) and the discharge port (25) are relatively far away from each other, the discharge component supplied into the air may diffuse before reaching the discharge port (25), and the amount of the discharge component contained in the vortex ring (R) may decrease. To address this problem, the component supply port (60) and the discharge port (25) are made close to each other, thereby allowing reduction in such diffusion of the discharge component.

The component supply port (60) located adjacent to the discharge port (25) is located substantially at the most downstream end of the air passage (C). This allows a sufficient distance between the component supply port (60) and the extrusion mechanism (30) (strictly speaking, the vibration plate (31)) to be secured. This sufficient distance allows reduction in adhesion of the discharge component which has been supplied from the component supply port (60), to the extrusion mechanism (30) even if the air in the air passage (C) flows slightly backward due to the vibration of the vibration plate (31). This reduction allows avoidance of an increase in frequency of maintenance of the extrusion mechanism (30) and peripheral components thereof required due to adhesion of the discharge component, for example.

Since the component supply port (60) is annular in shape, the flow rate of the air passing through the discharge port (25) is equalized circumferentially, as compared to a case in which the component supply port (60) is unevenly distributed circumferentially, for example. This allows the vortex ring (R) to be stably formed at the discharge port (25).

Configuration For Stabilizing Generation of Vortex Ring

Test Example 1 of Vortex Ring Generation Test

Figure 2A:
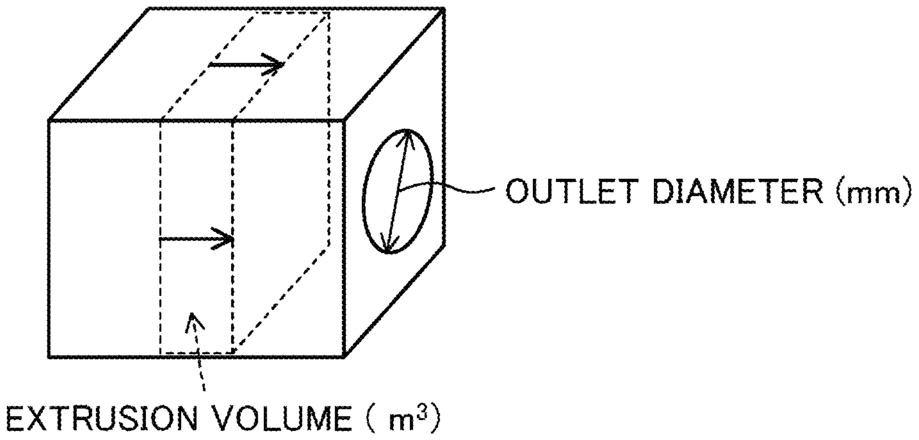
FIG. 2A is a perspective view of an outlet diameter D and an extrusion volume V in the vortex ring generation device.
Figure 2B:
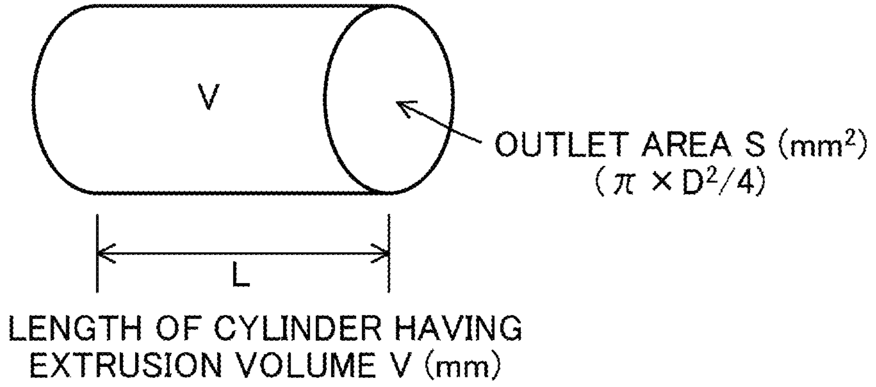
FIG. 2B is a perspective view of a cylinder having the extrusion volume V and the outlet diameter D.

A vortex ring generation test was conducted using the vortex ring generation device (10) of the present embodiment. In the vortex ring generation test, the casing (20) of the vortex ring generation device (10) was formed into a hollow cuboid having about 100 mm to about 150 mm sides, and the discharge port (25) had a diameter D of 30 mm, as shown in FIGS. 2A The vortex ring generation test was performed at a plurality of different values of extrusion frequency f (vibration frequencies of the vibration plate (31)) of air, ranging from 2 Hz to 30 Hz. When, in addition to D (mm) representing the diameter of the discharge port (25), V ($m^3$) represents an extrusion volume, L (mm) represents a length of the cylinder having the diameter D and the volume V (equivalent length of the cylinder), and U (m/s) represents an extrusion flow rate, the extrusion flow rate U varied within a range of 0.4 m/s to 3.2 m/s in response to the different values of extrusion frequency f. Further, the extrusion volume V ranged from 0.004 $m^3$ to 0.65 $m^3$, and the equivalent length L of the cylinder ranged from 6 mm to 92 mm (0.006 m to 0.092 m).

Figure 3:
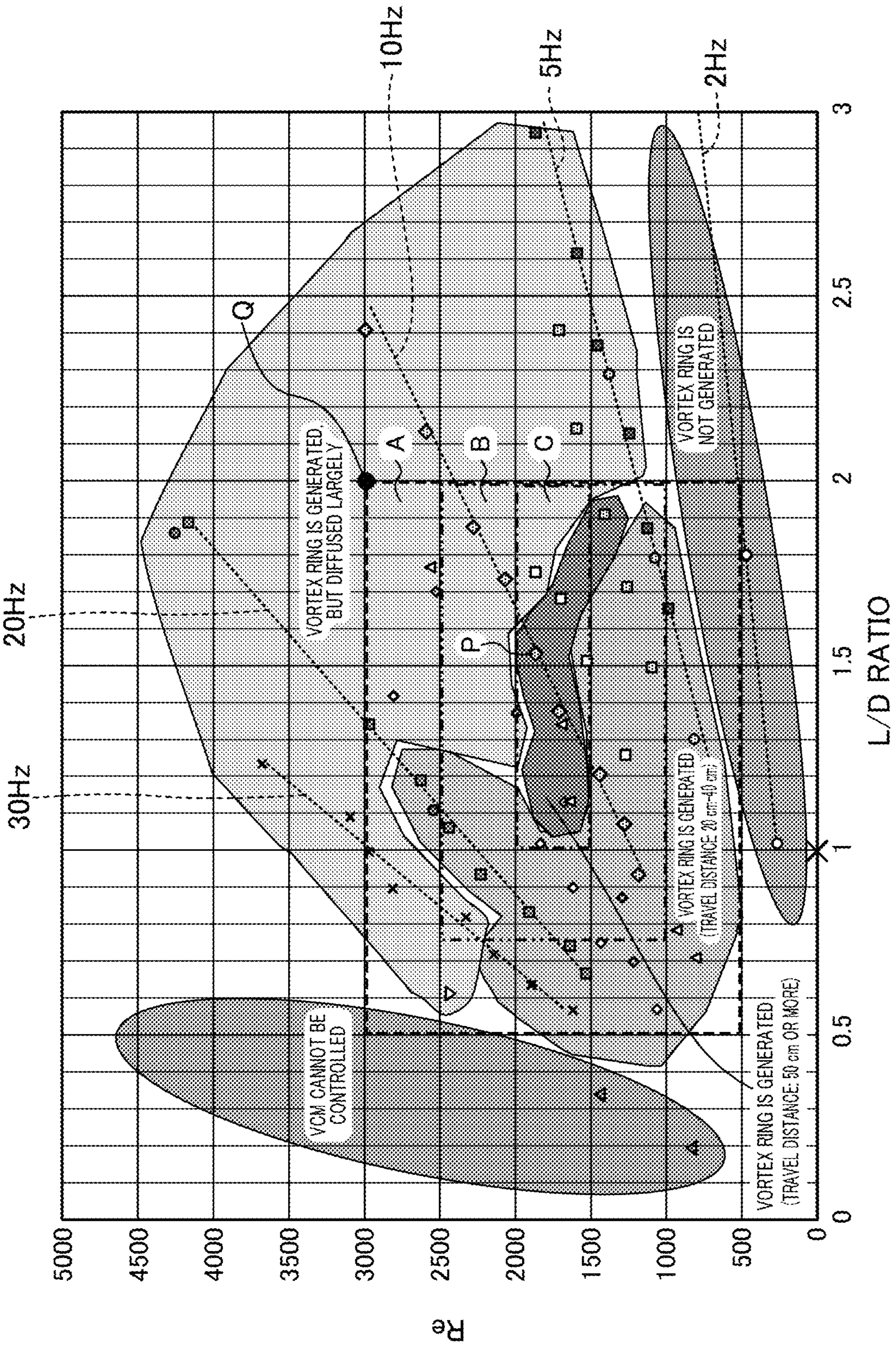
FIG. 3 is a graph showing results of a vortex ring generation test performed using the vortex ring generation device under different conditions, where the vertical axis indicates the Reynolds number Re and the horizontal axis indicates the L/D ratio.

FIG. 3 is a graph plotting test results (values at measurement points) where the vertical axis represents the Reynolds number Re, and the horizontal axis represents the L/D ratio. In the graph of FIG. 3, representative values of the extrusion frequency f are indicated on the respective lines each of which is obtained by connecting plotted points of the same value of the extrusion frequency f. As can be seen from the representative values and the lines, the smaller the extrusion frequency f is, the smaller the Reynolds number Re is and the wider the L/D ratio range is (the smaller the line inclination angle is), whereas the larger the extrusion frequency f is, the wider the Reynolds number is and the smaller the L/D ratio range is (the larger the line inclination angle is). The Reynolds number Re is a value expressed by an equation Re=UD/v (v: coefficient of kinematic viscosity ($m^2/s$)), and L/D is a value expressed by an equation UT/D (T: extrusion time (sec)).

When specific values of the Reynolds number Re, the L/D ratio, the extrusion frequency f, the flow rate U, the extrusion volume V, and the equivalent length L of the cylinder, at a point P shown in the graph are shown as the representative values, Re=1865, L/D=1.54, f=10 Hz, U=0.9 m/s, V=0.33 $m^3$, and L=46.1 mm (0.0461 m).

FIG. 3 shows a region in which a vortex ring having an outreach A of 20 to 40 (cm) was generated, a region in which a vortex ring having an outreach A of 50 (cm) or more was generated, a region in which a vortex ring was generated, but diffused a little more, a region in which a vortex ring was not generated, and a region in which the vibration plate (31) (linear actuator (35)) could not be fully controlled. The region in which the vortex ring was not generated is a region in which the extrusion frequency f was low. The region in which the vibration plate (31) could not be fully controlled is a region in which the extrusion frequency was high. In the range of the extrusion frequency f from 5 to 30 (Hz), a vortex ring was substantially generated, although the outreach A and the extent of diffusion were different.

In the range (A) in which the Reynolds number Re and the L/D ratio satisfy relationships of 500≤Re≤3000 and 0.5≤L/D≤2.0 in FIG. 3, a straight flow was hardly generated in the vortex ring, and a stable vortex ring whose lingering was hardly observed was generated. In the graph, the outreach A of the vortex ring at a point Q where Re=3000 and L/D=2 was about 1 m.

In the range (B) in which the Reynolds number Re and the L/D ratio satisfy relationships of 1000≤Re≤2500 and 0.75≤L/D≤2.0, the straight flow generated was less than that in the range (A), and a more stable vortex ring was generated. The range (C) in which the Reynolds number Re and the L/D ratio satisfy relationships of 1500≤Re≤2000 and 1.0≤L/D≤2.0 substantially corresponds to the region in which the outreach A of the vortex ring was 50 (cm) or more, and the straight flow generated was less than that in the range (B), and a further stable vortex ring was generated.

The above results show that the present embodiment allows only the vortex ring to be conveyed to a desired place without substantially generating a straight flow. Thus, the present embodiment allows the scent component not to be conveyed to an unintended place.

Test Example 2 of Vortex Ring Generation Test

Results of the test performed with the change in diameter of the discharge port (25) show that the outreach A (m) of the vortex ring increases approximately in proportion to the size of the diameter D (mm) of the discharge port (25). Therefore, when the test is performed under the same conditions as in Test Example 1 with the diameter D of the discharge port (25) set to 60 mm (0.06 m), the outreach A of the vortex ring at the point Q is about 2 m.

The above-described vortex ring generation test showed that the diameter D (mm) of the discharge port (25) suitable for increasing the outreach A of the vortex ring, the blow-out flow rate U (m/s), and the equivalent length L (mm) of the cylinder were within the following ranges.

The range of the diameter D of the discharge port (25): 60 mm≤D≤150 mm (0.06 m≤D≤0.15 m)

The range of the blow-out flow rate U: 0.30 m/s≤U≤0.75 m/s

The range of the equivalent length L of the cylinder was: 120 mm≤L≤300 mm (0.12 m≤L≤0.3 m)

The extrusion time T was 0.16≤T≤0.99 (sec). At that time, the Reynolds number Re was Re=3000 within the range (A) of 500≤Re≤3000, and the L/D ratio was L/D=2.0 within the range (A) of the range of 0.5≤L/D≤2.0.

Under the above-described conditions, a stable vortex ring having the outreach A of about 2 m was generated as described above. As described above, since the outreach A (m) of the vortex ring becomes longer in substantial proportion to the diameter D (mm) of the discharge port (25), a stable vortex ring having an outreach A of about 5 m can be generated at D=150 mm. Further, the range of the blow-out flow rate U (m/s) and the range of the equivalent length L (m) of the cylinder correspond to the generation of a vortex ring having a long outreach A if the range of the diameter D is set to 60 mm≤D≤150 mm.

As described above, in Test Example 2 of the vortex ring generation test of the present embodiment, the Reynolds number Re and the L/D ratio were limited to the range (A), and the diameter D (mm) of the discharge port (25), the blow-out flow rate U (m/s), and the equivalent length L (mm) of the cylinder were set to the ranges described above. Thus, it was possible to generate the vortex ring achieving the outreach A of 2 m≤A≤5 m.

Advantages of Embodiment

It has been difficult to generate a stable vortex ring by using a known vortex ring generation device. This is because, for example, the known vortex ring generation device requires the L/D ratio set to more than 2, which causes the vortex ring not to be stable and linger, and also requires the Reynolds number Re set to more than 3000, which causes the vortex to be turbulent and easily disappear due to its movement with dispersion.

As can be seen from the test results of the vortex ring generation tests described above, in the present embodiment, setting the Reynolds number Re and the L/D ratio within the range (A) that satisfies the relationships of 500≤Re≤3000 and 0.5≤L/D≤2.0 allows a stable vortex ring including substantially no straight flow to be generated.

Further, setting the Reynolds number Re and the L/D ratio within the range (B) satisfying the relationships of 1000≤Re≤2500 and 0.75≤L/D≤2.0 allows a vortex ring more stable than that in the range (A) to be generated.

In addition, setting the Reynolds number Re and the L/D ratio within the range (C) satisfying the relationship of 1500≤Re≤2000 and 1.0≤L/D≤2.0 allows a vortex ring more stable than that in the range (B) to be generated.

In particular, setting the diameter D (mm) of the discharge port (25), the blow-out flow rate U (m/s), and the equivalent length L (mm) of the cylinder to satisfy relationships of 0.06≤D≤0.15, 0.12≤L≤0.3, and 0.3≤U≤0.75 allows a stable vortex ring achieving an outreach A of 2 m≤A≤5 m to be generated.

As described above, the Reynolds number exceeding 3000 or being a large value such as 5000, 10000, or more causes diffusion of the vortex ring even if generated, and causes the vortex ring to be less likely to be generated. By contrast, in the present embodiment, the Reynolds number is limited to a relatively small range and the L/D ratio is also limited to a value suitable for this range of the Reynolds number, thereby allowing a prominent advantage of generating a stable vortex ring to be exhibited, as compared to the known device.

Therefore, the present embodiment allows a stable vortex ring with almost no straight flow to be generated and to be conveyed to the intended place. This allows avoidance of the conveyance of the scent to the unintended places when the vortex ring containing the scent component is conveyed. As a result, the present embodiment enables avoidance of situations in which the scent remains in a wide range including a place to which the scent component is not intended to be conveyed, which causes the olfactory sense to be accustomed to the effect, or people who are in the place where the scent is not intended to be conveyed to feel discomfort.

OTHER EMBODIMENTS

The above embodiment may also be configured as follows.

For example, in the above embodiment, the range (A) satisfying the relationships of 500≤Re≤3000 and 0.5≤L/D≤2.0, the range (B) satisfying the relationships of 1000≤Re≤2500 and 0.75≤L/D≤2.0, and the range (C) satisfying the relationships of 1500≤Re≤2000 and 1.0≤L/D≤2.0 are described. However, the range may be suitably changed into any range as long as it does not exceed the range (A). For example, a range satisfying relationships of 1000≤Re≤2500 and 0.5≤L/D≤2.0 may be employed instead of the range (B), or a range satisfying relationships of 1500≤Re≤2000 and 0.5≤L/D≤2.0 may be employed instead of the range (C).

In the above-described embodiment, the discharge component such as a scent component is contained in the vortex ring. However, in the vortex ring generation device of the present disclosure, the discharge component such as the scent component may not be included in the vortex ring.

While the embodiments and variations thereof have been described above, various changes in form and details may be made without departing from the spirit and scope of the claims. The embodiments and the variations thereof may be combined and replaced with each other without deteriorating intended functions of the present disclosure.

As described above, the present disclosure is useful for a vortex ring generation device.

The invention claimed is:

1. A vortex ring generation device comprising:
a casing having a gas passage and a discharge port; and
an extrusion mechanism configured to extrude a gas in the gas passage such that the gas in a vortex ring shape is discharged from the discharge port,
when V ($m^3$) represents an extrusion volume, D (m) represents a diameter of the discharge port, L (m) represents a length of a cylinder having the diameter D and the volume V, and Re represents a Reynolds number of the discharged gas,
500≤Re≤3000 and
0.5≤L/D≤2.0.

2. The vortex ring generation device of claim 1, wherein
1000≤Re≤2500 and
0.75≤L/D≤2.0.

3. The vortex ring generation device of claim 2, wherein
1500≤Re≤2000 and
1.0≤L/D≤2.0.

4. The vortex ring generation device of claim 1, wherein when U represents a blow-out flow rate (m/s),
0.06≤D≤0.15, 0.12≤L≤0.3, and
0.3≤U≤0.75.

5. The vortex ring generation device of claim 2, wherein when U represents a blow-out flow rate (m/s),
0.06≤D≤0.15, 0.12≤L≤0.3, and
0.3≤U≤0.75.

6. The vortex ring generation device of claim 3, wherein when U represents a blow-out flow rate (m/s),
0.06≤D≤0.15,
0.12≤L≤0.3, and
0.3≤U≤0.75.

* * * * *